United States Patent
Herrington et al.

(10) Patent No.: US 12,285,727 B2
(45) Date of Patent: Apr. 29, 2025

(54) HIGH REJECTION SPIRAL WOUND ELEMENTS WITH PROTECTIVE FEATURES

(71) Applicant: Aqua Membranes, Inc., Albuquerque, NM (US)

(72) Inventors: Rodney Herrington, Albuquerque, NM (US); Kevin Roderick, Albuquerque, NM (US); Christopher Kurth, Eden Prairie, MN (US)

(73) Assignee: Aqua Membranes, Inc., Albuquerque, NM (US)

( * ) Notice: Subject to any disclaimer, the term of this patent is extended or adjusted under 35 U.S.C. 154(b) by 0 days.

(21) Appl. No.: 18/751,125

(22) Filed: Jun. 21, 2024

(65) Prior Publication Data
US 2024/0350978 A1 Oct. 24, 2024

Related U.S. Application Data

(63) Continuation of application No. PCT/US2022/082394, filed on Dec. 27, 2022.
(Continued)

(51) Int. Cl.
*B01D 63/10* (2006.01)
*B01D 29/21* (2006.01)
*B01D 69/02* (2006.01)

(52) U.S. Cl.
CPC ........... *B01D 63/10* (2013.01); *B01D 63/101* (2022.08); *B01D 69/02* (2013.01);
(Continued)

(58) Field of Classification Search
CPC ...... B01D 63/10; B01D 63/101; B01D 69/02; B01D 2313/14; B01D 2313/23;
(Continued)

(56) References Cited

U.S. PATENT DOCUMENTS

| | | |
|---|---|---|
| 3,963,621 A | 6/1976 | Newman |
| 4,187,173 A | 2/1980 | Keefer |

(Continued)

FOREIGN PATENT DOCUMENTS

| | | |
|---|---|---|
| CA | 2662925 A1 | 1/2009 |
| CA | 2825674 C | 8/2011 |

(Continued)

OTHER PUBLICATIONS

U.S. Appl. No. 17/632,230, filed Sep. 15, 2022, Aqua Membranes.
(Continued)

*Primary Examiner* — Pranav N Patel
(74) *Attorney, Agent, or Firm* — V Gerald Grafe

(57) ABSTRACT

Printed spacer membrane elements offer the unique advantage of applying any pattern on the membrane surface to act as the feed spacer material. This is in contrast to conventional feed spacer mesh material that is uniform in thickness and density throughout the mesh. More open feed spaces can be utilized but may also result in higher stress concentration, and where the spacer material comes in contact with the opposing membrane leaf. This patent presents concepts for reducing the damage on membrane leaves by increasing the concentration of the print pattern near the center tube where the stress concentration on the membrane leaves is greatest, orienting the membrane sheets prior to rolling to minimize damage from slippage during rolling, moving the fold away from the first features to minimize leaks at the insertion point.

11 Claims, 13 Drawing Sheets

Related U.S. Application Data

(60) Provisional application No. 63/294,377, filed on Dec. 28, 2021, provisional application No. 63/294,378, filed on Dec. 28, 2021.

(52) U.S. Cl.
CPC ...... *B01D 2313/14* (2013.01); *B01D 2313/23* (2013.01); *B01D 2325/04* (2013.01); *B01D 2325/24* (2013.01)

(58) Field of Classification Search
CPC ............ B01D 2325/04; B01D 2325/24; B01D 2313/143; B01D 63/103; B01D 29/216; B32B 3/18; B32B 27/286; B32B 27/36; C02F 1/44
See application file for complete search history.

(56) References Cited

U.S. PATENT DOCUMENTS

| | | |
|---|---|---|
| 4,208,289 A | 6/1980 | Bray |
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,834,881 A | 5/1989 | Sawada |
| 4,842,725 A | 6/1989 | Blad et al. |
| 4,842,736 A * | 6/1989 | Bray .................. B01D 63/101 210/321.74 |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey, Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,299,749 A | 4/1994 | Thorogood |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-Ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |

(56) References Cited

U.S. PATENT DOCUMENTS

| | | |
|---|---|---|
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,341,663 B2 | 3/2008 | Offeman |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,883,007 B2 | 11/2014 | Buser |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,375,683 B2 | 6/2016 | Danisco |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2003/0024868 A1 | 2/2003 | Hallan |
| 2004/0011723 A1 | 1/2004 | Bradford |
| 2008/0290031 A1 | 11/2008 | Popa |
| 2010/0140161 A1* | 6/2010 | Haynes ............. B01D 65/003 210/321.83 |
| 2012/0018366 A1 | 1/2012 | Buser |
| 2012/0298578 A1 | 11/2012 | Herrington |
| 2013/0334128 A1 | 12/2013 | Takagi et al. |
| 2015/0157988 A1 | 6/2015 | McGinnis |
| 2016/0008763 A1 | 1/2016 | Roderick et al. |
| 2016/0236132 A1 | 8/2016 | Hara et al. |

FOREIGN PATENT DOCUMENTS

| | | | |
|---|---|---|---|
| EP | 2902094 | 8/2015 | |
| WO | WO2010047360 A1 | 4/2010 | |
| WO | WO2015016253 A1 | 2/2015 | |
| WO | WO2002/055179 | 8/2015 | |
| WO | WO2016199272 A1 | 12/2015 | |
| WO | WO2017087461 A1 | 5/2017 | |
| WO | WO-2020154734 A1 * | 7/2020 | ........... B01D 63/107 |

OTHER PUBLICATIONS

U.S. Appl. No. 17/610,499, filed Nov. 26, 2020, Aqua Membranes.

Huang, Frank "Performance Comparison Between Polyvinylidene Fluoride and Polytetrafluorethylene Hollow Fiber Membranes for Direct Contact Membrane Distillation" 1-16. MDPI Membranes. Online. Apr. 11, 2019; vol. 9 Article 52 pp. 1-16. (cited in ISR in parent PCT application).

Siddiqui A. "Porosity of space-filled channels in spiral-wound membrane systems: Quantification methods and impact on hydraulic characterization" 304-311. Water Research Online. Apr. 13,

(56) References Cited

OTHER PUBLICATIONS

2017. Article 119 pp. 304-311. (cited in ISR in parent PCT application).

* cited by examiner

HIGH REJECTION SPIRAL WOUND ELEMENTS WITH PROTECTIVE FEATURES

TECHNICAL FIELD

The subject invention relates to a membrane system utilized for the separation of fluid components, specifically spiral-wound membrane elements.

BACKGROUND ART

In cross-flow filtration, a feed fluid flows through a filter and is released at the other end, while some portion of the fluid is removed by filtration through a membrane surface which is parallel to the direction of fluid flow. Various forms of cross-flow filtration exist including plate-and-frame, cassette, hollow-fiber, and spiral wound systems. Plate-and-frame, cassette, and spiral-wound filtration modules often rely on stacked membrane layers which provide spacing between adjacent layers of filtration membrane. The present invention primarily relates to spiral wound membrane elements.

Spiral-wound membrane filtration elements known in the art consist of a laminated structure comprised of a membrane sheet sealed to or around a porous permeate carrier which creates a path for removal, longitudinally to the axis of the center tube, of the fluid passing through the membrane to a central tube, while this laminated structure is wrapped spirally around the central tube and spaced from itself with a porous feed spacer to allow axial flow of the fluid through the element from the feed end of the element to the reject end. Traditionally, a feed spacer mesh is used to allow flow of the feed water, some portion of which will pass through the membrane, into the spiral wound element and allow reject water to exit the element in a direction parallel to the center tube and axial to the element construction.

Improvements to the design of spiral wound elements have been disclosed in U.S. Pat. No. 6,632,357 to Barger et al., U.S. Pat. No. 7,311,831 to Bradford et al., and patents in Australia (2014223490), Japan (6499089), China (CN105163834B), Israel (240883), and South Korea (10-2196776) entitled "Improved Spiral Wound Element Construction" to Roderick et al. which replaces the feed spacer with islands or protrusions either printed, deposited or embossed directly onto the inside or outside surface of the membrane, or on the permeate carrier. U.S. Pat. No. 11,090,612 entitled "Graded spacers for filtration wound elements" to Roderick, et al, describe the use of height graded spacer features which are used to alter feed flow characteristics in a spiral wound element. US patent application PCT/US17/62424 entitled "Interference Patterns for Spiral Wound Elements" to Roderick, et al., describes patterns in spiral wound elements that keep membrane feed spaces open but also provide support for the membrane envelope glue areas during rolling. US patent application PCT/US18/55671 entitled "Bridge Support and Reduced Feed Spacers for Spiral-Wound Elements" to Roderick et al describes support features that are applied to the distal end (farthest end from the center tube) of the membrane envelop to provide support during gluing and rolling of the spiral wound element. US provisional application number 63,051,738 entitled "Variable Velocity Patterns in Cross Flow Filtration" to Herrington et al. describes support patterns that vary in size from the feed to the reject end of the membrane feed space in the feed flow path parallel to the center tube in order to control the velocity of the feed solution as the concentration of the feed solution increases from the feed to the reject end of the spiral wound element. U.S. Pat. No. 11,083,997 to Roderick, et al. entitled describe denser patterns in the feed and reject ends of the membrane feed space, and a more open pattern in the middle, in order to avoid nesting of the printed patterns during element fabrication. The references cited above can facilitate understanding of the present invention, and are incorporated herein by reference.

SUMMARY OF THE INVENTION

Embodiments of the present invention provide a spiral wound element comprising: (a) a center tube; (b) one or more membrane sheets, each membrane sheet being folded on itself at a fold line providing first and second membrane halves with inner surfaces facing each other, wherein each folded double membrane sheet is spirally wound around the center tube with the fold line proximal the center tube; (c) each membrane sheet having a plurality of spacing features disposed on the inner surface of the first half; and (d) a fold protection element mounted with the inner surface of the first half and with the inner surface of the second half, where the fold protection element extends from the fold a first distance on the first half and a second distance on the second half, where the second distance is greater than the first distance. In some embodiments, a region of the first half beginning at the fold and extending a third distance does not have spacing features, and wherein the second distance is greater than the third distance.

In some embodiments, the fold protection element comprises a region of the inner surface of the second half and the inner surface of the first half, on which is disposed a material the same as the material of the spacing features. The "same material" as used in this context means a material with the same relevant properties, e.g., conditions suitable for deposition on the membrane, mechanical properties, etc. It does not require identity in properties not relevant to mechanical performance or fabrication in this application and context.

In some embodiments, the fold protection element comprises tape with adhesive on one side only, where the adhesive side of the tape is adjacent to the inner surfaces of the first and second halves, where the tape has stiffness sufficient to prevent spacing features on the opposite half from damaging the half underlying the tape. In some embodiments, the tape is impermeable to prevent fluid flow through membrane that may be damaged near the fold. In some embodiments, the fold protection element may comprise UV cured ink jet material, hot melt polyolefins, urethanes, decals, or other materials that can be deposited on the active membrane surface. Thicknesses of the deposited fold protection material can be 0.010 inches thick, but more preferably 0.002 inches or less. The material should be flexible to avoid cracking at the fold line crease. In some embodiments, the tape comprises polyolefin or polyester.

Embodiments of the present invention provide a spiral wound element comprising: (a) a center tube; (b) one or more membrane sheets, each membrane sheet being folded on itself at a fold line providing first and second membrane halves with inner surfaces facing each other, wherein each folded double membrane sheet is spirally wound around the center tube with the fold line proximal the center tube; (c) each membrane sheet having a plurality of spacing features disposed on the inner surface of the first half; and (d) an inner wrap support element comprising a plurality of inner wrap support features disposed on the inner surface of the first half, where the inner wrap support features are disposed with a density and the spacing features are disposed with a density lesser than the density of the inner wrap support features.

In some embodiments, the fold protection spacing features are disposed with a density parallel to the center tube and a density orthogonal to the center tube, where the density parallel to the center tube is constant and wherein the density orthogonal to the center tube decreases as distance from the fold increases.

Embodiments of the present invention provide a method of producing a spiral wound element, comprising: (a) providing a center tube; (b) providing one or more membrane sheets, each membrane sheet being folded on itself at a fold line providing first and second membrane halves with inner surfaces facing each other, wherein each folded double membrane sheet is spirally wound around the center tube with the fold line proximal the center tube, each membrane sheet having a plurality of spacing features disposed on the inner surface of the first half; (c) providing a fold protection element mounted with the inner surface of the first half and with the inner surface of the second half, where the fold protection element extends from the fold a first distance on the first half and a second distance on the second half, where the second distance is greater than the first distance; (d) spirally winding the one or more membrane sheets about the center tube. In some embodiments the fold protection element comprises a polyurethane or epoxy-based adhesive disposed on the second surface of the first and second membrane halves and penetrated through the second surface into the corresponding membrane sheet.

MODES FOR CARRYING OUT THE INVENTION AND INDUSTRIAL APPLICABILITY

Figure 1:
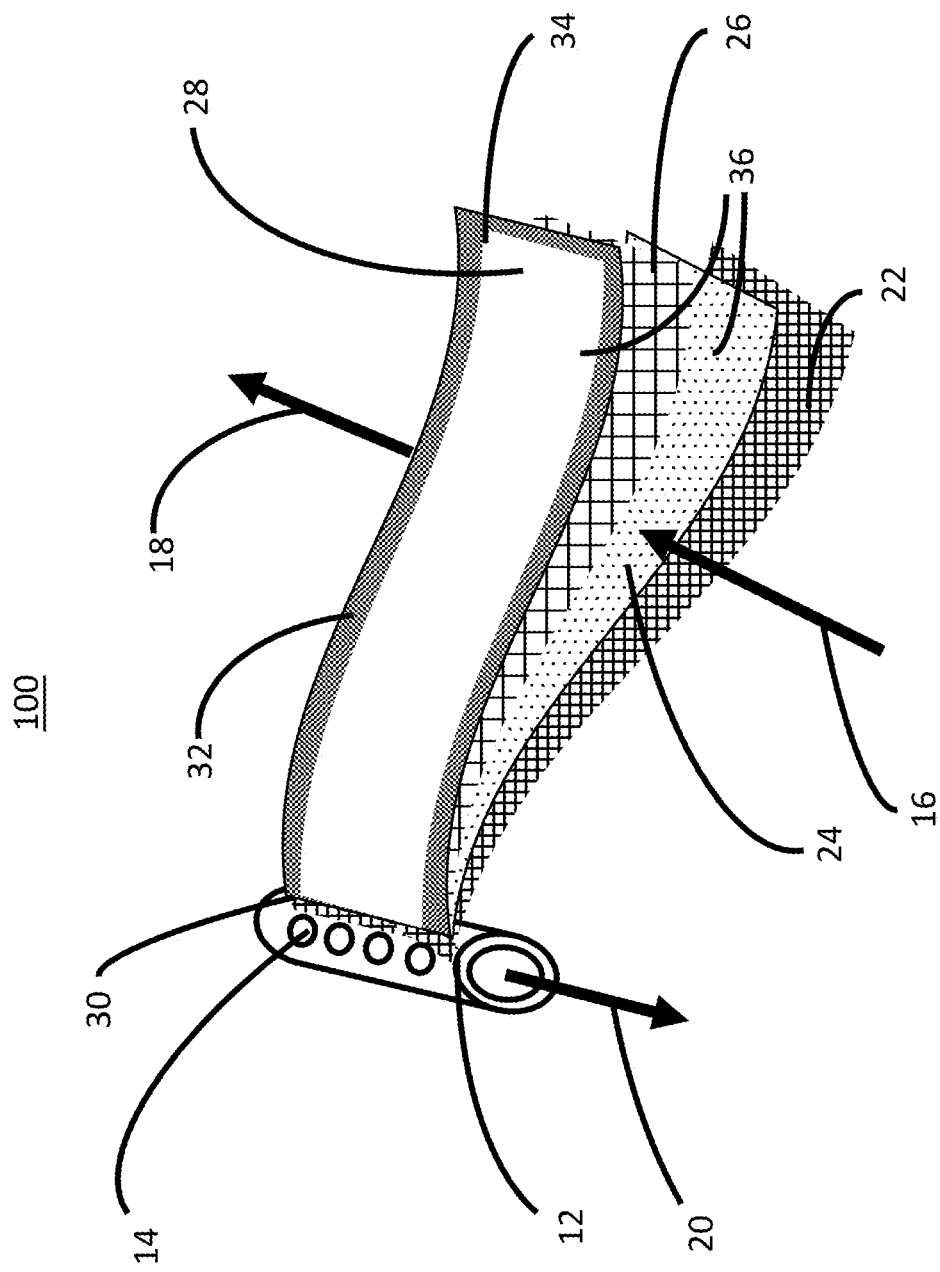
FIG. 1 is an exploded view of a spiral wound membrane element.

The feed spacer in a spiral wound filtration element is required to maintain a channel for fluid to flow from the feed to reject end of the feed channel, but the spacer design also impacts local flow velocities, turbulence, stagnation zones and other fluid flow conditions. Extruded mesh feed spacers have been used traditionally in membrane manufacture due to their ease of integration in the production process, but by the nature of their design many of their hydrodynamic characteristics are dependent on the thickness of the spacer. Conventional mesh spacers also provide uniform support characteristics in the feed space all the way from the distal end from the center tube to the proximal end of the membrane sheet near the center tube. Printed feed spacers allow for unique design characteristics unobtainable with conventional extruded or woven mesh spacers, since their thickness and geometry can be changed independently to yield a wide range of configurations which can be tailored to specific applications or specific challenges found in spiral wound membrane element construction.

Cross-flow filtration, by its nature, relies on some portion of the feed fluid to pass through the filter and become part of the filtrate, thus creating a situation where the quantity of the feed fluid is constantly being reduced as it passes through the filter. The higher the portion of filtrate produced, the lower the portion of feed/concentrate fluid that remains flowing through the filter. As a fluid flows through the element, a portion of the fluid passes through the membrane. Modeled simply, a constant flux through the membrane produces a gradually decreasing flow of the feed solution as it flows from the feed to the reject end of the feed space in the element. In reality, the amount of fluid passing through any location along the feed flow path depends on local flow conditions and local concentrations of solutes or suspended materials, as well as the local pressure which also depends on any back-pressure in the feed space as well as from the permeate side of the element locally.

During fabrication of a spiral wound element, permeate carrier material is attached to the center tube by tape or bonding, the membrane envelope is placed adjacent to the permeate carrier, and the flat sheet assembly is glued—to seal the permeate carrier envelope—and rotated around the center tube with a rotating mechanism such as a lathe. The center tube is captured or keyed to the lathe so that the lathe can rotate the center tube and wind the membrane envelope and permeate carrier around the center tube. Torque on the center tube must be adequate to roll the envelope until the entire envelope is wrapped around the center tube. Sufficient tension must be maintained in the membrane envelope to ensure the glue penetrates completely through the permeate carrier and contacts both membrane leaves to ensure the membrane envelope is completely sealed. As the membrane envelope is wrapped around the center tube, the diameter of the element increases. However, the torque and forces on the membrane envelope are greatest at the center tube where the diameter is smallest. Greater force proximal to the center tube creates greater force on the membrane envelope, particularly the feed space, during rolling. One of the key advantages of printed spacer technology is that more open feed spacer channels can be created. However, one aspect of more open feed spaces is that the concentration of forces applied to the membrane envelope, and consequently, the feed spacers, is that higher forces are applied to the feed spacer elements, particularly near the center tube. This can result in compression of the feed spacer support patterns into the membrane layers causing damage to the active surface of the membrane. This will result in a loss of rejection performance of the finished element, as well as an increase in flux due to damage on the active surface. The present invention provides a means to control the stress concentration in the membrane envelope near the center tube by increasing the density of the feed space support features in the membrane envelope in proximity to the center tube. Printed spacer technology is a new field and this increase in support pattern density near the center tube to avoid damage to active surfaces of the membrane leaves in not anticipated in the prior art.

The feed shaping features employed can be of any of a number of shapes, including round dots, ovals, bars with rounded ends, lenticular forms, stretched polygons, lines or other geometric shapes. Due to the shape of the features and the fact that the fluid must traverse around the outside of the features, the fluid flow velocity will change locally in the areas between the feed spacing features from the feed to reject end of the membrane element.

In spiral wound elements, the membrane leaf is folded at the center line where the center line comes in contact with the permeate carrier at the center tube prior to rolling. Fold protection is described in the prior art. Fold protection usually consists of tape applied along the width of the membrane sheet where it is folded. The prior art also discusses fold protection that is applied by printing or otherwise applying a polymer or other resin as the fold protection material. Fold protection is used to protect the membrane leaf where it is creased when folded in order to avoid damage from the crease. Damage in the crease without fold protection can result in loss of rejection and flux in the finished membrane element. Fold protection can be utilized uniquely in printed spacer technology by extending the fold protection over the top of the printed spacer features near the center tube to help avoid stress concentration of the printed spacer features from damaging the active surface of the membrane on the unprinted side of the membrane leaf.

With printed features the positioning of the crease relative to the beginning of the printed features has been found to be an important design feature that previously has not been recognized. By placing the fold at a distance larger than the core tube circumference divided by the number of leaves there is an ability to create a narrower membrane leaf which has a reduced tendency to move away from the insert point which in conventional mesh containing elements leads to central tube leaks. However, this distance should also be less than 1" to minimize the area of the leaf which would have reduced feed flow due to the narrower channel height. By keeping the fold within this distance range improved element construction can be achieved with fewer insert leaks, not previously possible.

With printed features on one half of each folded membrane sheet the inventors found a reduced occurrence of defects observed with the use of a common orientation where each sheet was oriented with the side of the membrane containing printed features closer to the central tube in a rolled element, resulting in a final membrane element having the printed features pointing away from the central tube. During the manufacture of the spiral wound element there is a differential slippage, with the side of a folded membrane sheet away from the central tube moving relative to the inner sheet. By minimizing the movement of features (e.g., element 70 in FIG. 5) damage to the opposing membrane sheet can be reduced and improved element performance realized.

FIG. 1 is a schematic illustration of a conventional spiral wound membrane element prior to rolling, showing important elements of a conventional spiral wound membrane element 100. Permeate collection tube 12 has holes 14 in collection tube 12 where permeate fluid is collected from permeate carrier 22. In fabrication, membrane sheet 36 is a single continuous sheet that is folded at center line 30, comprised of a non-active porous support layer on one face 28, for example polysulfone, and an active polymer membrane layer on the other face 24 bonded or cast on to the support layer. In the assembled element, active polymer membrane surface 24 is adjacent to feed spacer mesh 26, and non-active support layer 28 is adjacent to permeate carrier 22. Feed solution 16 enters between active polymer membrane surfaces 24 and flows through the open spaces in feed spacer mesh 26. As feed solution 16 flows through feed spacer mesh 26, particles, ions, or chemical species, which are excluded by the membrane are rejected at active polymer membrane surfaces 24, and molecules of permeate fluid, for instance water molecules, pass through active polymer membrane surfaces 24 and enter porous permeate carrier 22. As feed solution 16 passes along active polymer membrane surface 24, the concentration of materials excluded by the membrane increases due to the loss of permeate fluid in bulk feed solution 16, and this concentrated fluid exits the reject end of active polymer membrane sheet 24 as reject solution 18. Permeate fluid in permeate carrier 22 flows from distal end 34 of permeate carrier 22 in the direction of center tube 12 where the permeate fluid enters center tube 12 through center tube entrance holes 14 and exits center tube 12 as permeate solution 20. To avoid contamination of the permeate fluid with feed solution 16, non-active polymer membrane layers 28 are sealed with adhesive along adhesive line 32 through permeate carrier 22 thereby creating a sealed membrane envelope where the only exit path for permeate solution 20 is through center tube 12. Typically, the width of the adhesive line 32 is 1-3" after the adhesive has been compressed during the rolling process.

Figure 2:
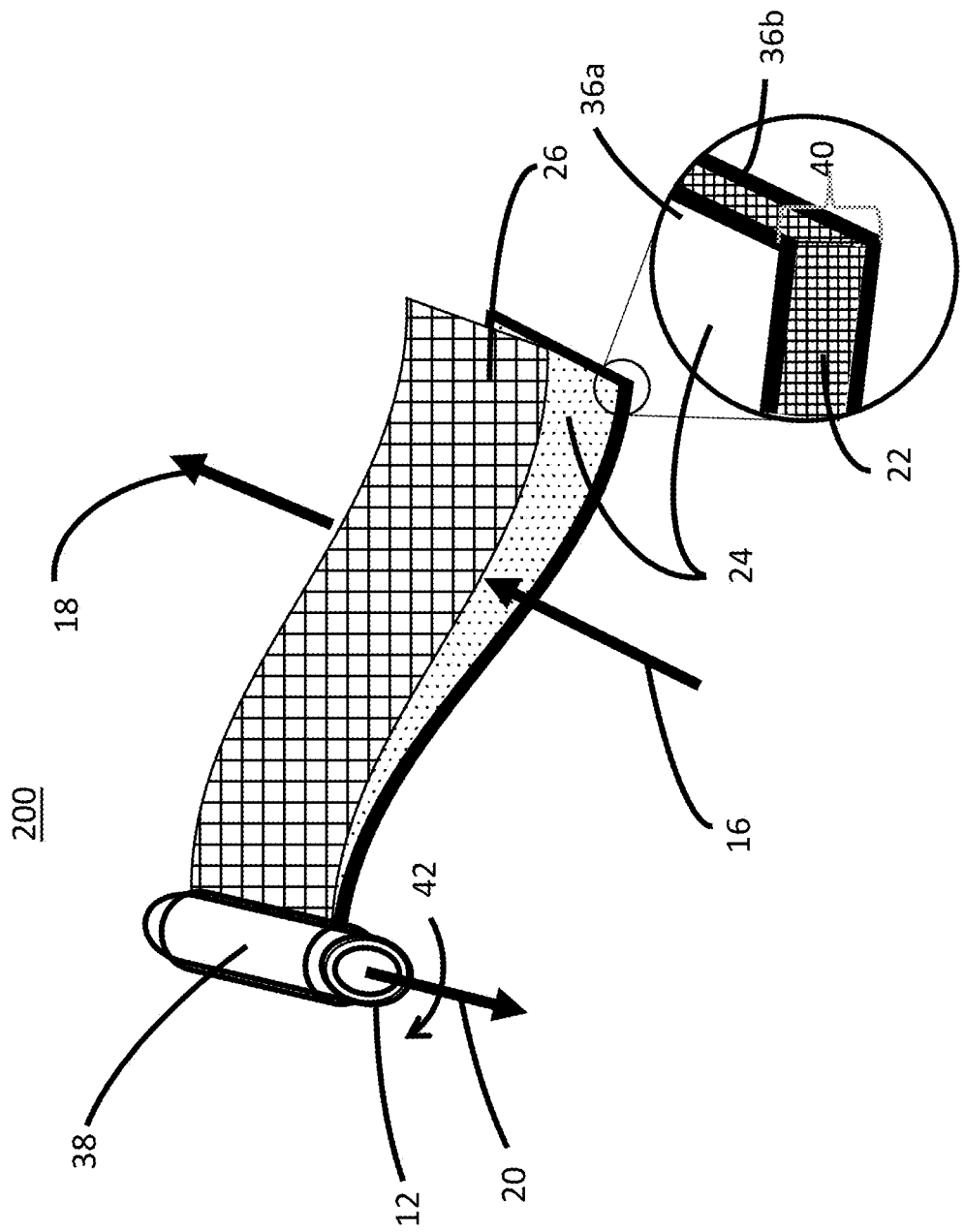
FIG. 2 is an exploded view of a partially assembled spiral wound membrane element.

A partially assembled spiral wound membrane element 200 is shown in FIG. 2. A membrane envelope 40 comprises, as described in connection with FIG. 1, a membrane sheet 36 folded at one end with a permeate carrier 22 disposed therebetween the membrane sheet and sealed along the edges with a suitable adhesive line 32 (FIG. 1). In the conventional design of membrane element once rolled, a feed spacer mesh 26 is placed adjacent to envelope 40 to allow the flow of feed fluid 16 to flow between layers of membrane envelope 40 and expose all of the active polymer surfaces 24 of the membrane sheet to feed fluid. Permeate, or product fluid is collected in the permeate carrier 22 inside membrane envelope 40 and proceeds spirally down to center tube 12 where the product, or permeate fluid is collected while the reject stream 18 exits the element. A single spiral wound element may comprise a single membrane envelope and feed spacer layer, or may comprise multiple membrane envelopes and feed spacer layers stacked and rolled together to form the element.

Figure 13:
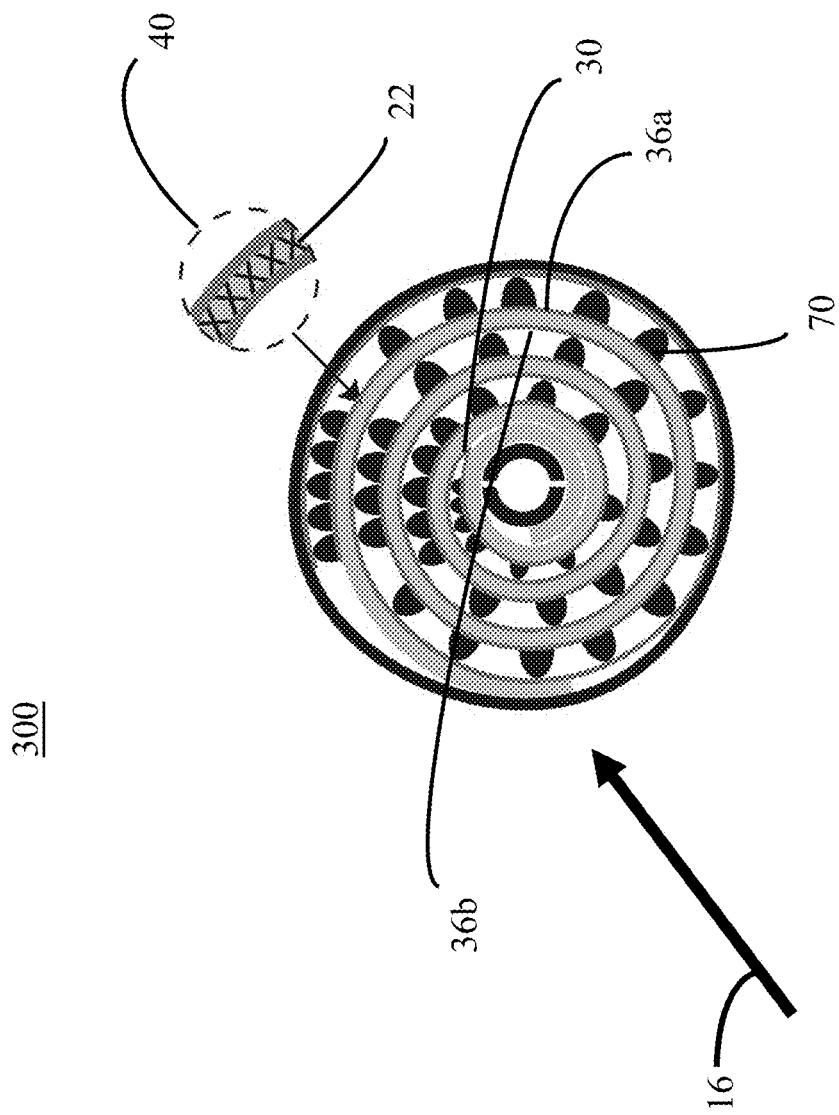
FIG. 13 is an end view of a spiral wound printed spacer element showing the components of the membrane envelope.

FIG. 13 further defines membrane element components of a spiral wound element utilizing printed spacer features 70. Membrane envelope 40 comprises membrane sheet 36a which is the active polymer membrane surface with printed spacer features 70 adhered thereto. Membrane sheet 36b is the active polymer side of membrane sheet 36 that does not have printed spacer features 70 adhered thereto. Membrane sheet 36 is folded at fold line 30 and has permeate carrier 22 glued on three sides along adhesive line 32 (FIG. 1) to create membrane envelope 40 so that permeate solution 20 (FIG. 1) can transfer to center tube 12 and discharge from center tube 12 as permeate solution 20. It is important note that membrane envelope 40 is bonded along adhesive line 32, and the adhesive is bonded to the inactive side of membrane sheet 36a and 36b on the non-active membrane layers 28 (FIG. 1).

Figure 3:
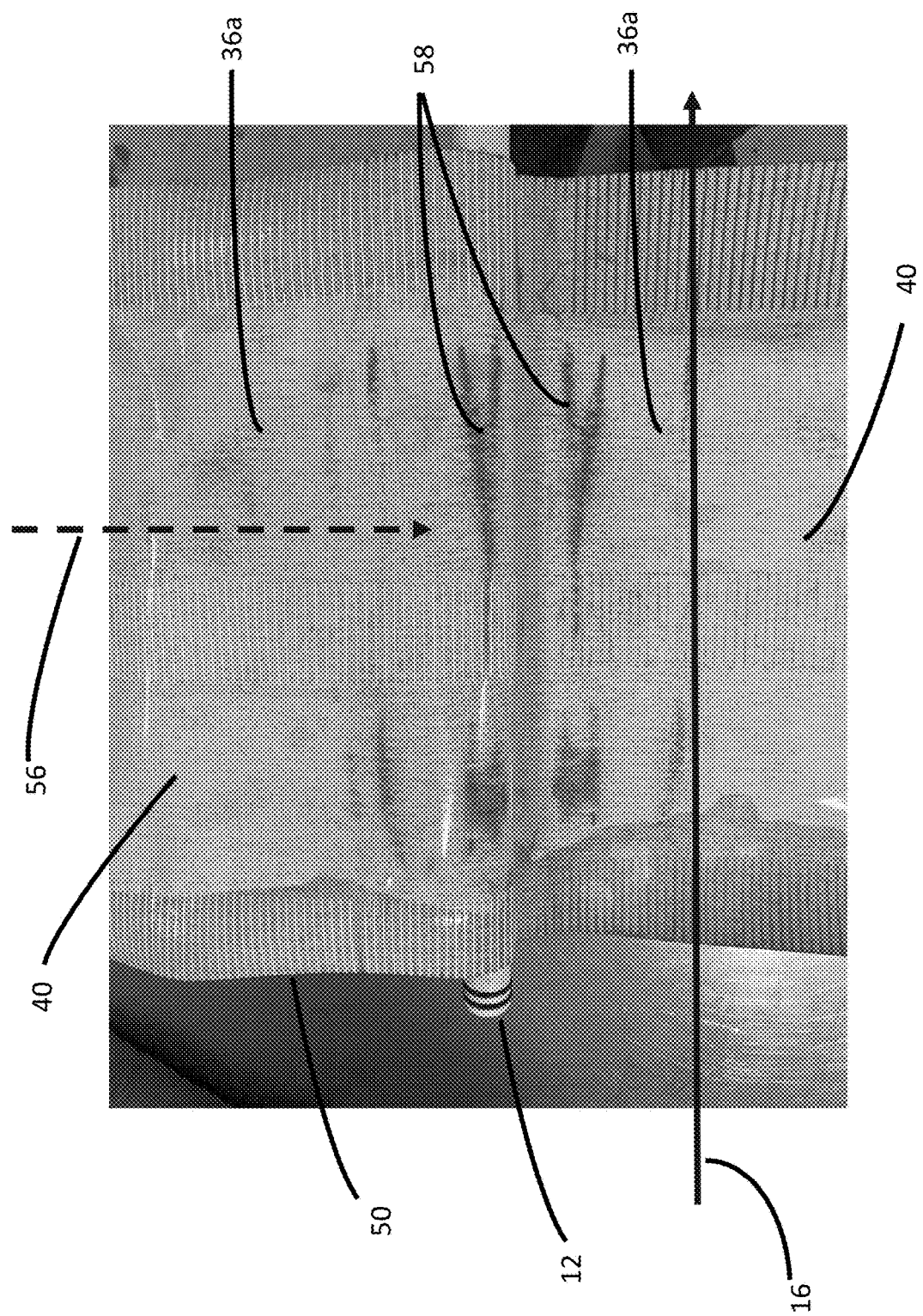
FIG. 3 is a view of a membrane sheet viewed after operation and autopsy showing damage from increased rolling tension near the center tube.

FIG. 3 depicts a membrane element opened for autopsy. The element of FIG. 3 comprises two membrane envelopes 40. Membrane envelopes 40 are wrapped around center tube 12 and adhesively bonded to center tube 12 on both ends. Permeate fluid is flowing in permeate carrier 22 (FIG. 2) toward center tube 12 as indicated by flow direction arrow 56. Autopsy reveals damage 58 on membrane sheets 36 on membrane envelopes 40 from increased pressure at center tube 12 from rolling during the fabrication process.

Figure 4:
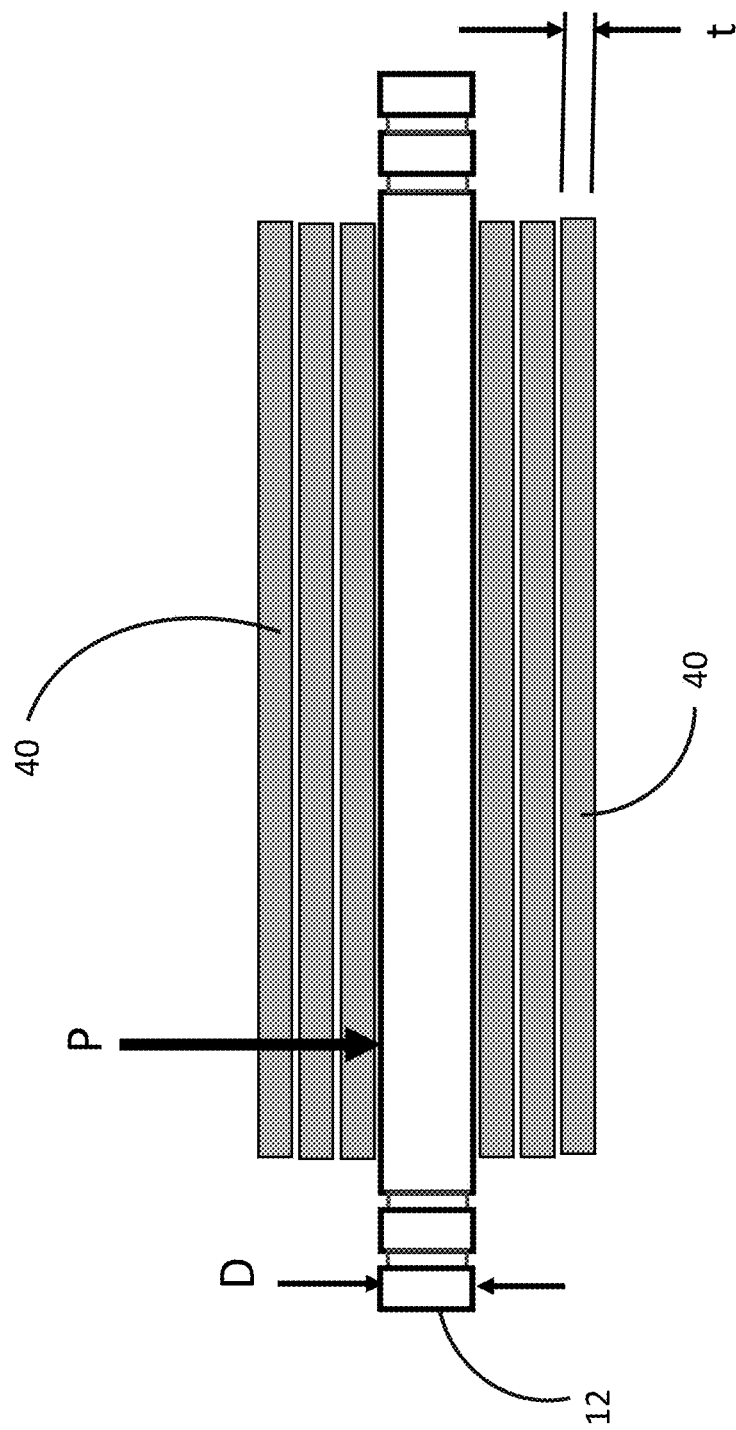
FIG. 4 is a longitudinal cross section view of a spiral wound membrane element.

FIG. 4 defines the components of a spiral wound element in longitudinal cross section. Membrane envelopes 40 are wrapped around center tube 12. The number of wraps for a finished outside diameter of the element is explicitly defined by the diameter of center tube 12 and the number of wraps of membrane envelope 40 around the center tube. The number of wraps is also defined by the number of membrane envelopes 40 that comprise the completed assembly. The equation defining the pressure P applied to the center tube is given by:

$$P_{total} = \sum_{i=0}^{N} \frac{2T}{(D + i2t)t}$$

Where:
P is the uniform pressure on the center tube
T is tension on the membrane envelope 40 during rolling
D is the diameter of the center tube
t is the thickness of membrane envelope 40
N is the number of layers of membrane envelope 40
i is the current layer, 0 indicating the first layer.

Figure 5:
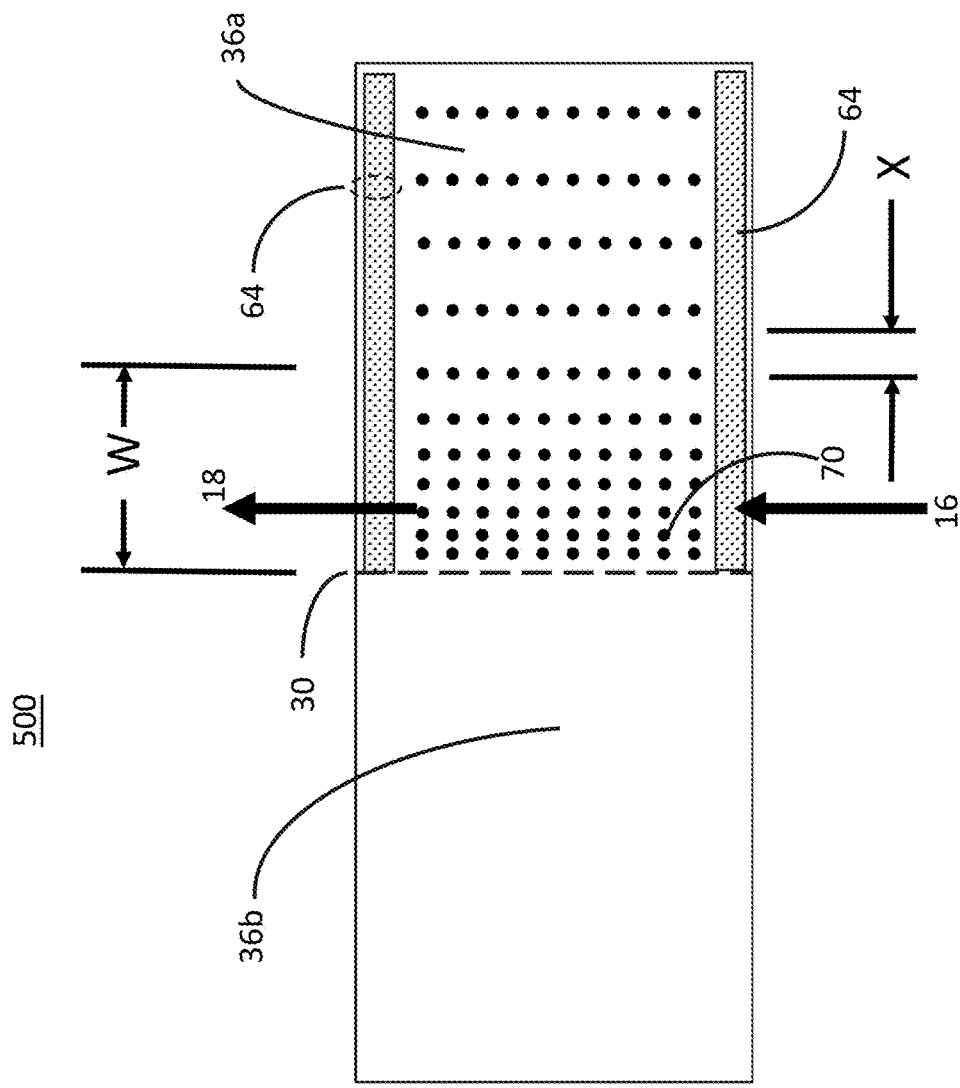
FIG. 5 is a view of a spiral-wound element membrane sheet with denser spacing features near the center tube to provide more support during fabrication.

In many automatic spiral wound element rolling systems, tension is applied to permeate carrier 22 in order to ensure uniform rollup of the spiral wound element, and to ensure adequate tension is applied to ensure membrane envelope 40 is sealed at adhesive lines 32 (FIG. 1) when glue must penetrate permeate carrier 22 and seal to the non-active surfaces of the membrane sheets to seal membrane envelope 40. It is apparent from the equation that the tension on membrane envelope 40 during rolling is a major component of the pressure on center tube 12, and the smaller the diameter of center tube 12 the more pressure on center tube 12. It is also apparent that more compression exists on the first wrap of membrane envelope 40 around center tube 12, and the larger the quantity of wraps, the greater the pressure on center tube 12. Consequently, the first wrap of membrane envelope 40 around center tube 12 sees the greatest compressive force on spacer elements 70 (FIG. 5).

As an example, consider an 1812 spiral wound element. This element is 1.8 inches (45.7 mm) in diameter and 12 inches (304.8 mm) long. Calculation of the force on the first wrap is show on the following chart with the dimensional and force assumptions given:

TABLE 1

FORCE ON FIRST WRAP OF MEMBRANE SUPPORTS

| Center Tube Dia | 0.75 | In. |
| Membrane sheet thickness | 0.005 | in. |
| Permeate Carrier Thickness | 0.011 | in. |
| Feed Spacer Thickness | 0.010 | In. |
| Thickness of membrane envelope leaf plus feed spacer | 0.031 | In. |
| Tension on Permeate carrier during winding | 5 | lb |
| Diameter of support | 0.02 | In. |
| Spacing between supports | 0.25 | In. |
| Qty supports per sq in. | 16 | |
| Total support area | 0.0050 | in sq. |
| Individual support area | 0.0003 | sq in |

| Wrap Number | Diameter | Force on CT at wrap psi | Total Force on CT Total psi | Force per support at CT LB |
|---|---|---|---|---|
| 0 | 0.75 | | 0 | |
| 1 | 0.812 | 0.35 | 0.35 | 4.41 |
| 2 | 0.874 | 0.31 | 0.67 | 8.27 |
| 3 | 0.936 | 0.28 | 0.94 | 11.71 |
| 4 | 0.998 | 0.25 | 1.19 | 14.80 |
| 5 | 1.06 | 0.23 | 1.42 | 17.61 |
| 6 | 1.122 | 0.21 | 1.62 | 20.19 |
| 7 | 1.184 | 0.19 | 1.82 | 22.58 |
| 8 | 1.246 | 0.18 | 1.99 | 24.79 |
| 9 | 1.308 | 0.17 | 2.16 | 26.86 |
| 10 | 1.37 | 0.16 | 2.32 | 28.79 |
| 11 | 1.432 | 0.15 | 2.46 | 30.62 |
| 12 | 1.494 | 0.14 | 2.60 | 32.34 |
| 13 | 1.556 | 0.13 | 2.73 | 33.97 |
| 14 | 1.618 | 0.12 | 2.86 | 35.52 |
| 15 | 1.68 | 0.12 | 2.98 | 37.00 |
| 16 | 1.742 | 0.11 | 3.09 | 38.41 |
| 17 | 1.804 | 0.11 | 3.20 | 39.76 |

It is apparent from the chart in the example shown above that the applied tension load (T) on the permeate carrier must be reduced by 10 to 1 as winding occurs (to reduce 39.76 lbs to 4.41 lbs). This can be programmed into the tensioning mechanism on an automatic winding machine as the winding process occurs. Note this is a non-linear reduction due the increased circumference of each wrap as winding occurs. In this instance, it takes 16 to 17 wraps to achieve 1.8 inch (45.7 mm) circumference of the finished element. To appropriately roll spiral wound elements with printed spacers there is a desired rolling pressure. Too high a pressure can result in membrane damage near center tube 12, and too low a pressure and glue will not penetrate permeate carrier 22 (FIG. 2) and can also result in the finished diameter of the membrane element being too small. To avoid damage of the polyamide membrane surface, the pound per square inch concentration on any particular spacer element 70 should be less than 50 psi, and preferably less than 25 psi. The optimal rolling pressure will be different for each size membrane element. The force on any particular spacer element will also be determined by the spacing density and surface area size of individual spacer elements 70. An example embodiment is shown in the table above for spacing features 0.020 inches in diameter with a feature to feature spacing of 0.25 inches. The allowable rolling tension will vary with each element size based on the diameter of the center tube, the diameter of the finished element, support feature spacing, support feature surface area, and characteristics of the adhesive that is used to seal membrane envelope 40.

FIG. 5 illustrates an example embodiment of the present invention whereby feed spacer elements 70 are spaced closer X as they approach center fold line 30 which is the starting point for wrapping around center tube 12 (FIG. 1) during fabrication. Closer spacing of spacer element 70 can begin at a distance W that is one-third the length of the printed half of membrane sheet 36a from center line 30. Distance W may also begin at one-quarter of the distance from fold line 30 versus the full length of the printed half of membrane sheet 36a, but also one-tenth or shorter of the distance from fold line 30 versus the full length of the printed half of membrane sheet 36a. During preparation for fabrication, feed spacer elements 70 are printed or otherwise attached on only one-half of the active surface of membrane sheet 36a. In alternative embodiments of fabrication, spacer elements 70 are applied on the back side of membrane sheet 36a. In an example embodiment, feed spacer elements 70 are applied to the active surface of membrane sheet 36a. Subsequent to feed spacer elements 70 attachment to membrane sheet 36a, membrane sheet 36 is folded at center line 30 so that the active surfaces of membrane sheet 36a and 36b are facing each other. Feed spacer elements 70 provide spacing between the active surfaces of membrane sheet 36 to allow feed fluid 16 to flow parallel to center line 30 between the active surfaces of membrane sheet 36 and depart the feed space as reject solution 18. By decreasing the spacing X of spacer elements 70 toward center line 30 there is more support per unit area on membrane sheet 36 in order to mitigate damage to membrane sheet 36 during the fabrication and rolling process. The height of spacer elements 70 can be reduced near fold line 30 so that they do not apply a significant concentration force on the opposing unprinted surface of membrane sheet 36b. Adhesive support features 64 can comprise a denser spacing configuration than spacer elements 70 in order to provide support along the edges of membrane sheet 36b from adhesive compressing membrane sheet 36a along the edges and closing the inlet and outlet feed channels.

Figure 6:
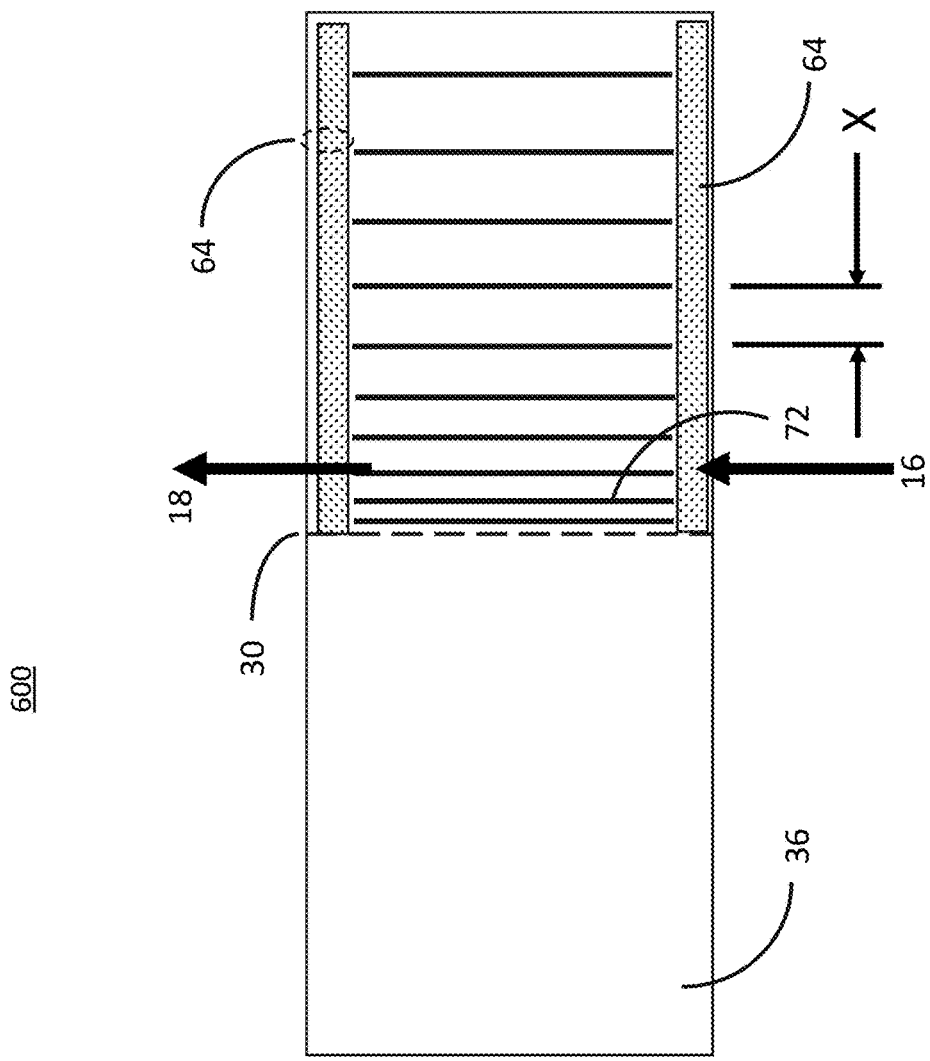
FIG. 6 is a view of a spiral-wound element membrane sheet with denser spacer lines near the center tube to provide more support during fabrication.

An example embodiment of the present invention illustrated in FIG. 6. shows a variation in feed spacing support features 72 which provide more support along the feed solution flow path from feed fluid 16 until it leaves the feed space of membrane sheet 36 as rejection solution 18. In this instance, support features 72 comprise continuous lines. Since support features 72 are parallel to the feed solution direction of flow, they do not represent significant resistance to feed fluid flow.

Figure 7:
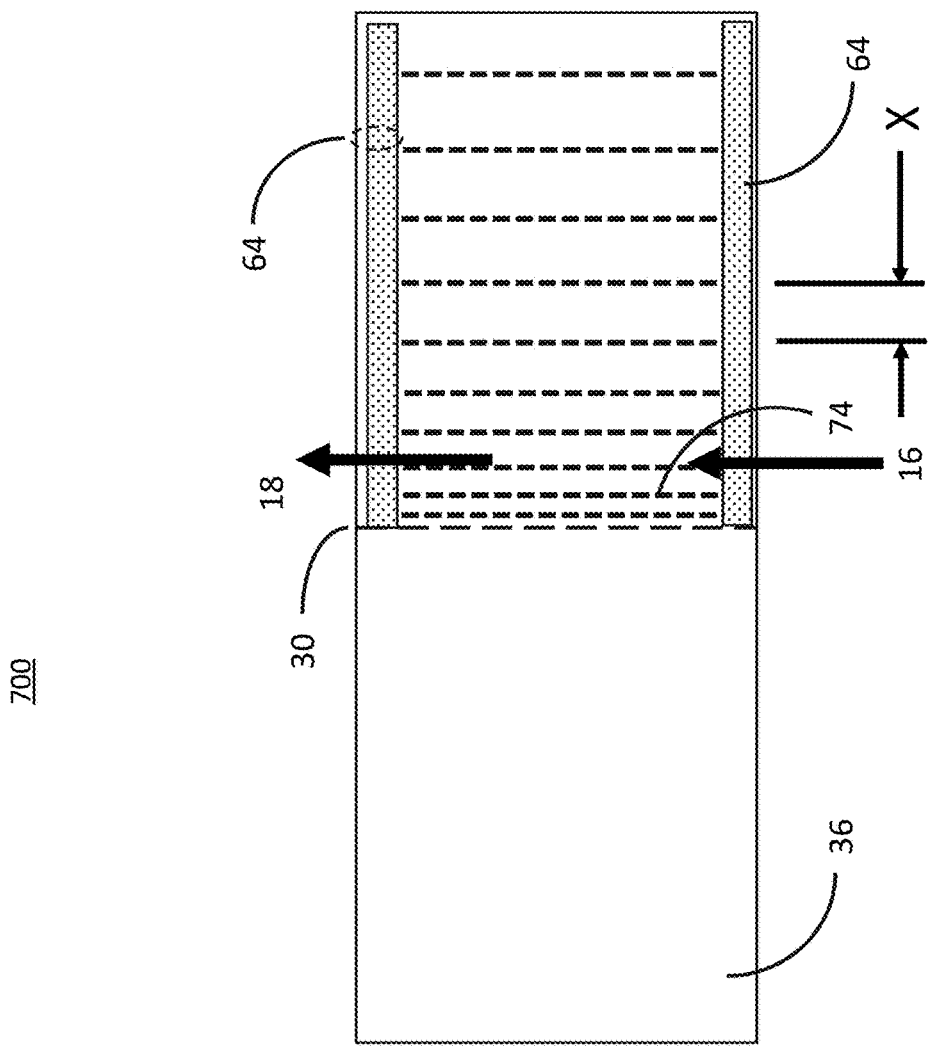
FIG. 7 is a view of a spiral-wound element membrane sheet with denser spacer dotted or dashed lines near the center tube to provide more support during fabrication.

An example embodiment of the present invention illustrated in FIG. 7 shows a variation in feed spacing support features 74 which provide more support along the feed solution flow path from feed fluid 16 until it leaves the feed space of membrane sheet 36 as rejection solution 18. In this instance, support features 74 comprise dashed lines that may have a wide variety of lengths of segments and spacing between segments. Since support features 74 are parallel to the feed solution direction of flow, they do not represent significant resistance to feed fluid flow.

Figure 8:
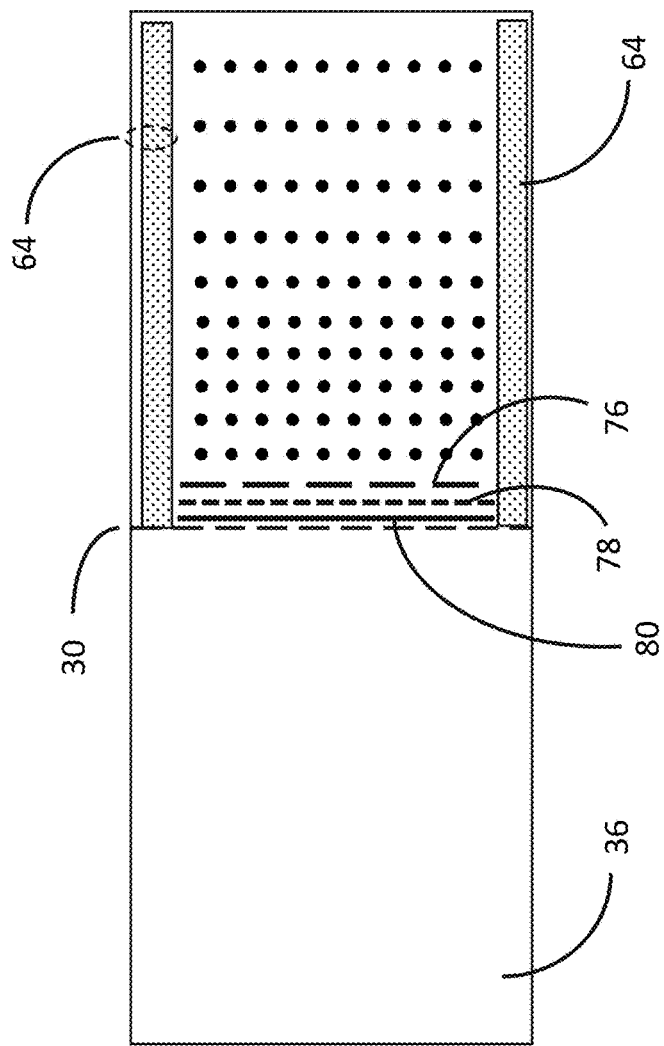
FIG. 8 is a view of a spiral-wound element membrane sheet with denser spacer features and lines or dashed or dotted lines near the center tube to provide more support during fabrication.

An example embodiment of the present invention is illustrated in FIG. 8. Feed spacing support features 76, 78, and 80 can comprise a combination of line segments that can comprise continuous lines, dashed lines with close spacing, and multiple dashed lines with wider spacing between segments in the line. As noted before, since support features 76, 78, and 80 are parallel to the feed solution direction of flow, they do not represent significant resistance to feed fluid flow.

Figure 9:
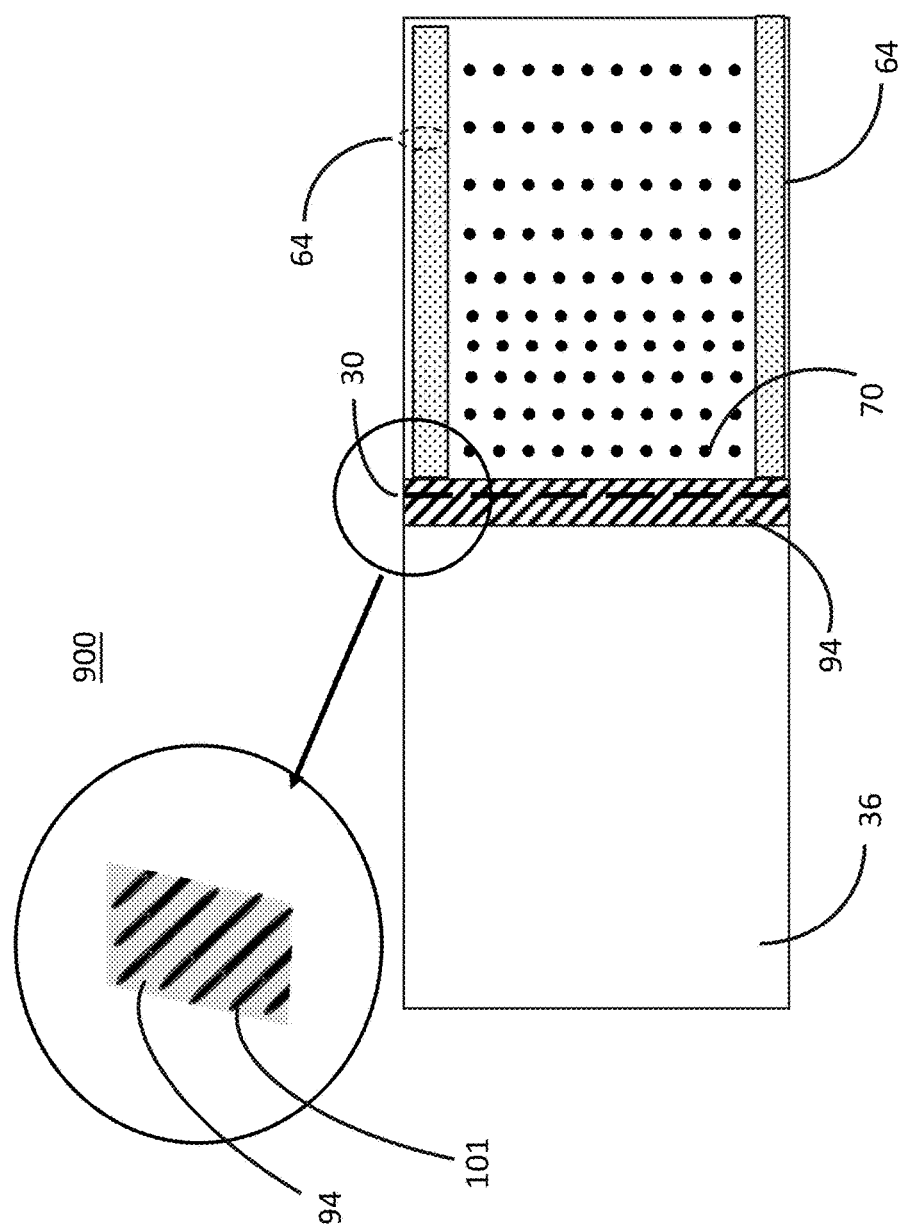
FIG. 9 is a view of a spiral wound element membrane sheet with fold line support at the center line.

An example embodiment of the present invention is shown in FIG. 9, where fold line support 94 comprises printed raised patterns 100 that provide separation support when membrane sheet 36 is folded at center line 30. In this configuration, printed raised patterns 100 cross at fold line 30 and interfere (meaning do not nest when folded) with each other so that fluid can flow parallel to center tube 30 over and around the features in printed raised pattern 100. In this configuration, printed raised patterns 100 can be used in combination with spacing features 70 to provide support proximal to center line 30.

Figure 10:
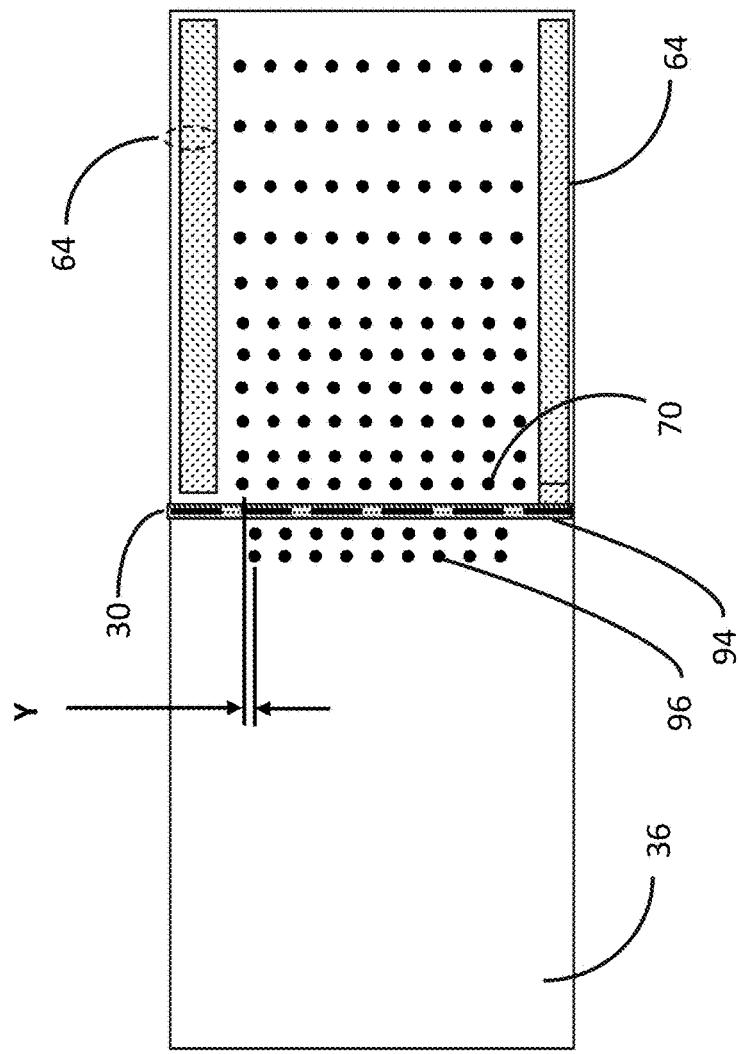
FIG. 10 is a view of a spiral wound element membrane sheet with fold line support and support features on both sides of the center line that are offset from each other.

In an example embodiment of the present invention shown in FIG. 10, spacer features 70 reside on one side of center line 30 and alternating spacer features 96 reside on the other side of center line 30. Spacing features 96 are proximal to center tube 12 to provide additional support near center tube 12. When the membrane sheet is folded at center line 30 it is undesirable for spacing features 70 and 96 to interfere during rolling. Too avoid interference from occurring, spacing features 70 and 96 are offset from each other by dimension Y. In addition, spacing support features 70 and 96 may be at a lower height near center line 30 to help reduce stress concentration proximal to center line 30.

Figure 11:
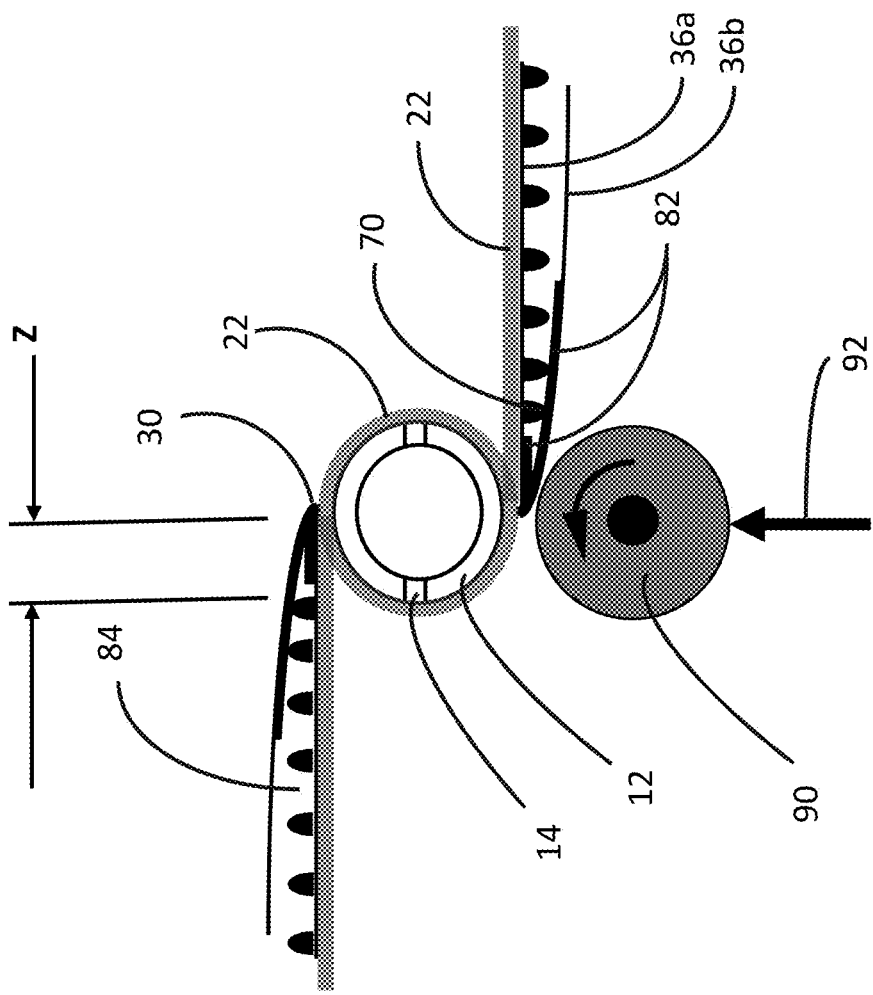
FIG. 11 is a view of the end of a spiral wound element with two membrane leaves prior to rolling with fold protection at the apex of the fold in the membrane and printed features on the membrane sheet adjacent to the center tube.

Many membrane elements use fold line support features to protect the fold line from leaks caused by creases or deformation of the active surface of the membrane leaf. Fold line protection can take many forms but is typically some from of adhesive tape. The tape protects the membrane sheet at the crease from damage, or if it is damaged during folding, it seals the membrane leaf from leakage. The prior art also discusses the use of printed material as the fold line protection material. FIG. 11 shows an end view of center tube 12 with permeate carrier 22 wrapped around center tube 12 prior to rolling into a membrane element. FIG. 11 depicts two membrane envelopes 40 that will be wrapped around center tube 12. However, any number of membrane envelopes 40 may be wrapped around center tube 12 depending on how big in diameter the membrane element may be, and how thin membrane envelopes 40 may be. In this view, fluid to be treated enters feed space 84 and then passes through membrane sheets 36 and into permeate carrier 22. Permeate fluid flows within permeate carrier 22 where it enters center tube 12 via fluid holes 14, and out the end of center tube 12.

Figure 12:
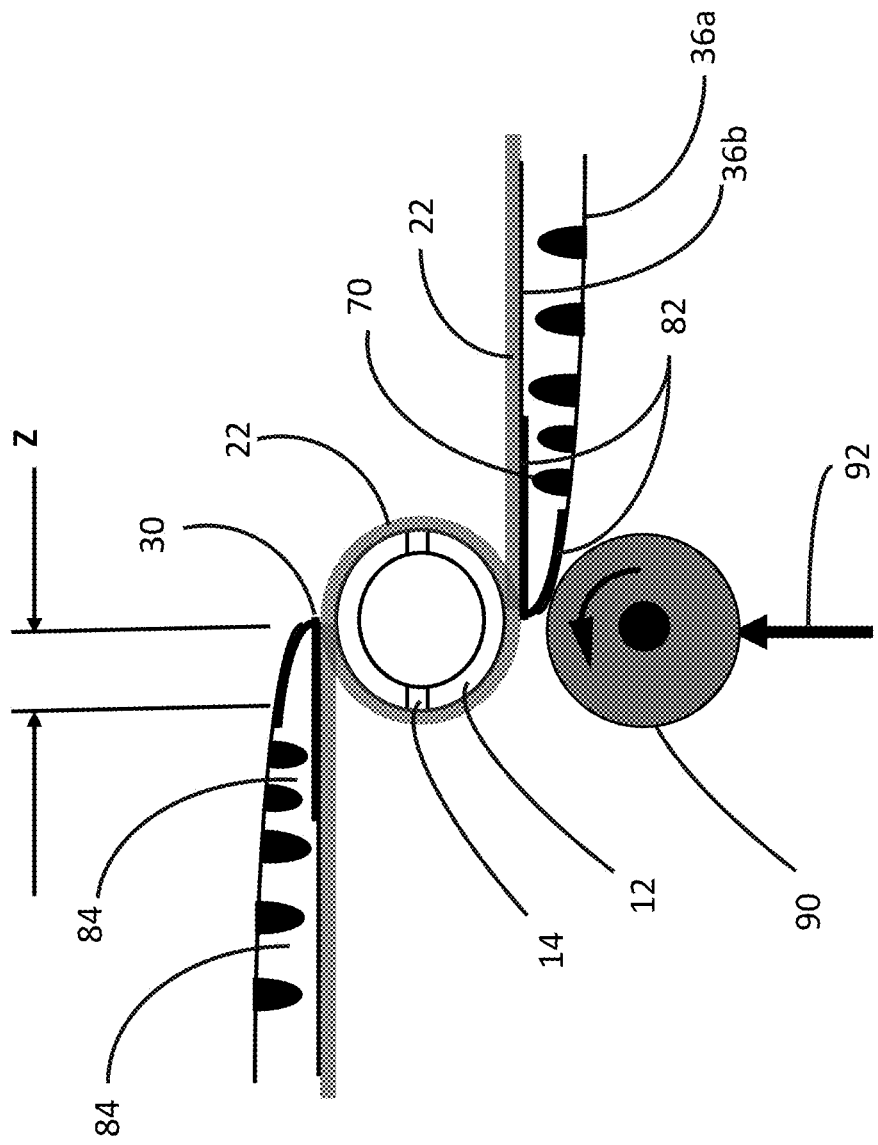
FIG. 12 is a view of the end of a spiral wound element with two membrane leaves prior to rolling with fold protection at the apex of the fold in the membrane and printed features on the membrane sheet opposite the center tube.

FIG. 11 represents an application of fold line protection 82, either tape or printed material, that starts adjacent to support features 70, at the end of the printed half of membrane sheet 36 proximal to center tube 12, continues at the crease along fold line 30 and then extends on to the unprinted opposing surface of membrane sheet 36 and over the top of support features 70 for an appropriate distance, typically 1 inch or less, to mitigate the force concentration of the tops of support features 70 where they impinge on the unprinted surface of membrane sheet 36. An optimal distance of fold line 30 from the beginning of support features 70 can also be defined as the distance determined by the outside diameter of center tube 12 divided by the number of membrane envelopes 40 (FIG. 2) that comprise spiral wound membrane element 200 (FIG. 2). The optimal distance is also preferred to be less than 1" as distances larger than this increase the area having altered flow characteristics due to the reduced channel height. As previously noted, support features 70 can be smaller in height near center tube 12. Additionally, support features 70 may be spaced from 0 inches to a length Y which can be a distance that is less than the diameter of center tube 12. In this configuration, fold protection 82 may be extended in length to cover a segment of the tops of support features 70. In the embodiment shown in FIG. 11, support features 70 are applied or otherwise bonded to the half of membrane sheet 36 that will be adjacent to center tube 12 after fabrication. In this embodiment, support features 70 will open geometrically at the tops of support features 70 which will open the flow path between support features 70 and help reduce the fluid pressure losses near center tube 12 from the feed to the reject end of the finished membrane element. In an embodiment shown in FIG. 12, support features 70 can be applied to membrane sheet 36b that is opposite to unprinted membrane sheet 36a that is glued through permeate carrier 22 that is rolled adjacent to center tube 12 and glued to center tube 12. In an embodiment shown in FIG. 10, support features 70 can be printed on both active surfaces of membrane sheet 36, (36a and 36b), but the patterns 96 can be offset to ensure they do not interfere during rolling as they slip past each other.

During rolling operations, presser bar 90 is often used to hold membrane envelopes 40 (FIG. 2) against center tube 12 to help maintain uniform rolling of the membrane envelopes to ensure they do not wrinkle or crease during rolling. Presser bar 90 rotates freely on bearings and rotates by virtue of friction against the membrane element during rolling. Damage to membrane sheets 36 can occur if presser bar pressure 92 is too great. With printed spacer elements, the desired presser bar pressure to avoid damage to the membrane during rolling should be as light as possible to avoid applying additional force concentration on support features 70. In any event, the applied force on a 40-inch long element by presser bar 70 for printed spacer elements should be optimally 16-18 lbs, but less than 25 lbs. To minimize load concentration on support features 70 presser bar 90 should be as large in diameter as possible for a given size element, or multiple presser bars can be utilized to spread the load.

The fold protect element may also be constructed by applying a polyurethane or epoxy based adhesive the the second surface of the fold region. The polyurethane or epoxy based adhesive used should be selected with appropriate viscosity and wicking properties to penetrate into the second surface preventing flow through the region that it has penetrated. An optional step of using a scraper or roller to smooth out the adhesive may also be performed which can also assist with penetration of the adhesive into the second surface. To simplify handling, stacking, and storage of the membrane sheet while the adhesive is still tacky, tape may be applied to cover the adhesive and may remain present in the assembled membrane element.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

What is claimed is:

1. A spiral wound element comprising:
   (a) a center tube;
   (b) one or more membrane sheets, each membrane sheet being folded on itself at a fold line providing first and second membrane halves with inner surfaces facing each other, wherein each folded double membrane sheet is spirally wound around the center tube with the fold line proximal the center tube;
   (c) each membrane sheet having a plurality of spacing features disposed on the inner surface of the first half; and
   (d) a fold protection element mounted with the inner surface of the first half and with the inner surface of the second half, where the fold protection element extends from the fold a first distance on the first half and a second distance on the second half, where the second distance is greater than the first distance.

2. The element of claim 1, wherein the fold protection element comprises a region of the inner surface of the second half and the inner surface of the first half, on which is disposed a material the same as the material of the spacing features.

3. The element of claim 1, wherein the fold protection element comprises tape with adhesive on one side only, where the adhesive side of the tape is adjacent to the inner surfaces of the first and second halves, where the tape is impermeable.

4. The spiral wound element of claim 1, wherein the fold protection element comprises
   (e) a plurality of fold protection features disposed on the inner surface of the first half, where the fold protection features are disposed with a first density and the spacing features are disposed with a second density lesser than the first density.

5. The element of claim 4, wherein the fold protection features are disposed with a density parallel to the center tube and a density orthogonal to the center tube, where the density parallel to the center tube is constant and wherein the density orthogonal to the center tube decreases with increasing distance from the fold.

6. A method of producing a spiral wound element, comprising:
   (a) providing a center tube;
   (b) providing one or more membrane sheets, each membrane sheet being folded on itself at a fold line providing first and second membrane halves with inner surfaces facing each other, wherein each folded double membrane sheet is spirally wound around the center tube with the fold line proximal the center tube, each membrane sheet having a plurality of spacing features disposed on the inner surface of the first half;
   (c) providing a fold protection element mounted with the inner surface of the first half and with the inner surface of the second half, where the fold protection element extends from the fold a first distance on the first half and a second distance on the second half, where the second distance is greater than the first distance;
   (d) spirally winding the one or more membrane sheets about the center tube.

7. The element of claim 3, wherein the tape comprises polyolefin or polyester.

8. The element of claim 1, wherein a region of the first half beginning at the fold and extending a third distance does not have spacing features, and wherein the second distance is greater than the third distance.

9. The method of claim 6, wherein a region of the first half beginning at the fold and extending a third distance does not have spacing features, and wherein the second distance is greater than the third distance.

10. The element of claim 1, wherein the fold protection element comprises a polyurethane or epoxy-based adhesive disposed on the second surface of the first and second membrane halves and penetrated through the second surface into the corresponding membrane sheet.

11. A spiral wound element comprising:
    (a) a center tube;
    (b) one or more membrane sheets, each membrane sheet being folded on itself at a fold line providing first and second membrane halves with inner surfaces facing each other, wherein each folded double membrane sheet is spirally wound around the center tube with the fold line proximal the center tube;
    (c) each membrane sheet having a plurality of spacing features disposed on the inner surface of the first half;
    (d) an inner wrap support element comprising a plurality of inner wrap support features disposed on the inner surface of the first half, where the inner wrap support features are disposed with a first density and the spacing features are disposed with a second density greater than the first density; and (e) a fold protection element mounted with the inner surface of the first half and with the inner surface of the second half, where the fold protection element extends from the fold a first distance on the first half and a second distance on the second half, where the second distance is greater than the first distance.

* * * * *